(12) United States Patent
Tsai et al.

(10) Patent No.: US 10,288,255 B2
(45) Date of Patent: May 14, 2019

(54) LENS ARRAY, VEHICLE-LAMP LENS GROUP USING LENS ARRAY, AND VEHICLE-LAMP ASSEMBLY USING VEHICLE-LAMP LENS GROUP

(71) Applicant: Lextar Electronics Corporation, Hsinchu (TW)

(72) Inventors: Tsung-Huan Tsai, Taipei (TW); Yu-Min Lin, New Taipei (TW)

(73) Assignee: LEXTAR ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 15/821,717

(22) Filed: Nov. 22, 2017

(65) Prior Publication Data

US 2018/0149336 A1 May 31, 2018

(30) Foreign Application Priority Data

Nov. 30, 2016 (TW) .............................. 105139780 A
Jun. 9, 2017 (TW) .............................. 106119310 A

(51) Int. Cl.
| | |
|---|---|
| *F21V 7/00* | (2006.01) |
| *F21V 5/00* | (2018.01) |
| *F21V 14/04* | (2006.01) |
| *F21V 14/08* | (2006.01) |
| *G02B 19/00* | (2006.01) |
| *F21S 41/143* | (2018.01) |
| *F21S 41/255* | (2018.01) |
| *F21S 41/663* | (2018.01) |

(Continued)

(52) U.S. Cl.
CPC ............ *F21V 5/007* (2013.01); *F21S 41/143* (2018.01); *F21S 41/151* (2018.01); *F21S 41/153* (2018.01); *F21S 41/255* (2018.01); *F21S 41/663* (2018.01); *F21S 41/686* (2018.01); *F21V 5/008* (2013.01); *F21V 14/04* (2013.01); *F21V 14/08* (2013.01); *G02B 19/0014* (2013.01); *G02B 19/0066* (2013.01); *F21S 41/285* (2018.01); *F21V 29/763* (2015.01); *F21W 2102/145* (2018.01); *F21Y 2103/10* (2016.08); *F21Y 2105/12* (2016.08); *F21Y 2115/10* (2016.08)

(58) Field of Classification Search
CPC ......... F21S 41/675; F21S 41/17; F21V 11/08; F21V 11/16; F21V 7/09
USPC ....................................................... 362/514
See application file for complete search history.

(56) References Cited

U.S. PATENT DOCUMENTS

| | | |
|---|---|---|
| 5,780,140 A | 7/1998 | Nilsen |
| 6,587,147 B1 | 7/2003 | Li |

(Continued)

FOREIGN PATENT DOCUMENTS

| | | |
|---|---|---|
| CN | 102375238 B | 5/2014 |
| TW | 201350896 A | 12/2013 |

(Continued)

*Primary Examiner* — Jamara A Franklin
(74) *Attorney, Agent, or Firm* — CKC & Partners Co., LLC

(57) ABSTRACT

A lens array is disposed on a substrate and includes a plurality of converging lenses. The converging lenses are configured to project light beams and are arranged along a first direction. Two of the light beams respectively converged by adjacent two of the converging lenses at least partially overlap with each other by geometry of the adjacent two converging lenses, a distance between the adjacent two converging lenses, or a combination thereof.

20 Claims, 14 Drawing Sheets

(51) Int. Cl.
*F21S 41/686* (2018.01)
*F21S 41/153* (2018.01)
*F21S 41/151* (2018.01)
F21V 29/76 (2015.01)
F21Y 105/12 (2016.01)
F21Y 103/10 (2016.01)
F21Y 115/10 (2016.01)
F21S 41/20 (2018.01)
F21W 102/145 (2018.01)

(56) References Cited

U.S. PATENT DOCUMENTS

| | | |
|---|---|---|
| 6,796,694 B2 * | 9/2004 | Natsume ............. F21S 48/2212 |
| | | 362/346 |
| 6,859,326 B2 | 2/2005 | Sales |
| 7,403,338 B2 | 7/2008 | Wu et al. |
| 2014/0133168 A1 | 5/2014 | Fiederling et al. |
| 2015/0070926 A1 | 3/2015 | Stefanov et al. |

FOREIGN PATENT DOCUMENTS

| | | |
|---|---|---|
| TW | 201614271 A | 4/2016 |
| TW | 201617644 A | 5/2016 |

* cited by examiner

LENS ARRAY, VEHICLE-LAMP LENS GROUP USING LENS ARRAY, AND VEHICLE-LAMP ASSEMBLY USING VEHICLE-LAMP LENS GROUP

RELATED APPLICATIONS

This application claims priority to Taiwanese Application Serial Number 105139780, filed Nov. 30, 2016, and to Taiwanese Application Serial Number 106119310, filed Jun. 9, 2017. The entire disclosure of the above application is hereby incorporated by reference herein.

BACKGROUND

Technical Field

The present invention relates to a lens array, a vehicle-lamp lens group using a lens array, and a vehicle-lamp assembly using the vehicle-lamp lens group.

Description of Related Art

The vehicular luminary has already been one of the key development projects in the field of lighting. With the current technique nowadays, light-emitting diodes (LEDs) have gradually replaced the conventional light sources applied in the vehicular luminaries because LEDs have advantages such as high luminous efficacy, high brightness, low power consumption and instant response. However, as the LEDs are applied in the vehicular luminaries for improving the luminous efficacy, an illumination area or a light type of light provided by a vehicle lamp may be affected. Accordingly, there is still room to improve optical efficiency of different vehicle-lighting systems under the condition of controlling an illumination area or a light type of a light beam.

SUMMARY

In accordance with one embodiment of the present disclosure, a vehicle-lamp assembly includes a light-source array, a lens array, and a projection lens. Light beams provided by the light-source array can be converged by refraction mechanism provided by the lens array, and then the light beams can enter the projection lens. The lens array includes a plurality of converging lenses, and two of the light beams respectively converged by adjacent two of the converging lenses at least partially overlap with each other by geometry of the adjacent two converging lenses, a distance between the adjacent two converging lenses, or a combination thereof, thereby improving the illumination uniformity of the light beams provided by the vehicle-lamp assembly. With the converging lenses, the vehicle-lamp assembly can provide a plurality of zones with illumination. A light type of the light beam projected to each of the zones can be controlled individually, such that an adjustment of the light type of the light beam projected by the vehicle-lamp assembly tends to simplicity.

In accordance with one embodiment of the present disclosure, a lens array disposed on a substrate and comprising a plurality of converging lenses. The converging lenses are configured to project light beams and arranged along a first direction, in which two of the light beams respectively converged by adjacent two of the converging lenses at least partially overlap with each other by geometry of the adjacent two converging lenses, a distance between the adjacent two converging lenses, or a combination thereof. Each of the converging lenses has an illuminating surface facing away from the substrate and having a first central point and a first optical axis, and the first optical axis passes through the first central point. A curvature of the illuminating surface measured along a direction perpendicular to the first direction substantially satisfies:

$$y = \left(\frac{x^2}{R1}\right) \bigg/ 1 + \sqrt{\left(1 - (1+K1)\left(\frac{x}{R1}\right)^2\right)}.$$

The parameter R1 is given by $1<R1<10$, and the parameter K1 is given by $-2<K1<0$. The parameter y is a distance from any point on the illuminating surface to the first central point measured along a direction parallel to the first optical axis. The parameter x is a distance from the point on the illuminating surface to the first optical axis measured along a direction perpendicular to the first optical axis.

In some embodiments, the illuminating surface has a first curvature measured along the first direction and has a second curvature measured along a second direction which is orthogonal to the first direction, and the first curvature is different than the second curvature.

In some embodiments, the lens array further includes a light inlet surface and a light outlet surface which are defined together by the converging lenses. An area of the light inlet surface is A1, an area of a vertical projection of the light inlet surface on the substrate is A2, an area of the light outlet surface is A3, an area of a vertical projection of the light outlet surface on the substrate is A4, and A3>A1>A2=A4.

In some embodiments, the converging lenses are arranged along the first direction and a second direction which is orthogonal to the first direction, and a first group of the converging lenses and a second group of the converging lenses are arranged in a linearly symmetric distribution.

In some embodiments, the converging lenses are arranged in a T-shaped distribution or a U-shaped distribution.

In some embodiments, the converging lenses are arranged as three or more than three rows in a matrix arrangement.

In some embodiments, adjacent two of the converging lenses have different lengths along the first direction.

In some embodiments, adjacent two of the converging lenses have different lengths along a second direction which is orthogonal to the first direction.

In some embodiments, vertical projections of adjacent two of the converging lenses on the substrate abut against each other.

In some embodiments, vertical projections of adjacent two of the converging lenses on the substrate are separated from each other.

In accordance with one embodiment of the present disclosure, a vehicle-lamp lens group includes a lens array, a light-source array, and a projection lens. The lens array is disposed on a substrate. The light-source array is disposed on the substrate and between the substrate and the lens array. The light-source array includes a plurality of light sources disposed on the substrate and arranged at least along the first direction. The lens array is configured to project at least one light beam provided by the light-source array. The projection lens covers the lens array.

In some embodiments, the number of the converging lenses arranged in a first row of the lens array is (2N+1), and N is a positive integer. The number of the light sources which are within a vertical projection of the (N+1) converging lenses arranged in the first row of the lens array is plural.

In some embodiments, a focal length of the projection lens is F, a shortest distance from the projection lens to the lens array is D, and $F \leq D \leq 2F$.

In some embodiments, the projection lens has a light-emitting surface and at least one microstructure. The light-emitting surface faces away from the lens array, and the microstructure is disposed on the light-emitting surface of the projection lens.

In some embodiments, the projection lens has a light-receiving surface and at least one microstructure. The light-receiving surface faces the lens array, and the microstructure is disposed on the light-receiving surface of the projection lens.

In some embodiments, the projection lens has a light-emitting surface facing away from the lens array and having a second central point and a second optical axis, the second optical axis passes through the second central point. A curvature of the light-emitting surface of the projection lens measured along a direction perpendicular to the first direction substantially satisfies:

$$n = \left(\frac{(m)^2}{R}\right) \Big/ 1 + \sqrt{\left(1 - (1+K2)\left(\frac{M}{R2}\right)^2\right)}.$$

The parameter R2 is given by 10<R2<100. The parameter K2 is given by −2<K2<0. The parameter n is a distance from any point on the light-emitting surface to the second central point measured along a direction parallel to the second optical axis. The parameter m is a distance from the point on the light-emitting surface to the second optical axis measured along a direction perpendicular to the second optical axis.

In accordance with one embodiment of the present disclosure, a vehicle-lamp assembly includes a vehicle-lamp lens group, a fixed frame, a heat-dissipation base, a heat-dissipation device, and a switch device. The fixed frame has an opening therein, and the projection lens is disposed within the fixed frame through the opening. The heat-dissipation base has at least one heat-dissipation fin. The fixed frame is disposed on the heat-dissipation base, the light-source array is disposed in the heat-dissipation base, and the light-source array and the lens array are located between the heat-dissipation base and the projection lens. The heat-dissipation device is connected with the heat-dissipation base and configured to generate an airflow traveling toward the heat-dissipation fin. The switch device is disposed between the light-source array and the projection lens and has at least one light-blocking plate. The projection lens, the switch device, and the light-source array are assembled along an arranging direction, and the light-blocking plate is movable in a switch direction which intersects the arranging direction.

In some embodiments, the light-blocking plate at least comprises a front light-blocking plate and a back light-blocking plate.

In some embodiments, the switch device has a light-reflection zone disposed on the front light-blocking plate and facing the projection lens.

In some embodiments, the switch device has a light-blocking zone disposed on the back light-blocking plate and facing the light-source array.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
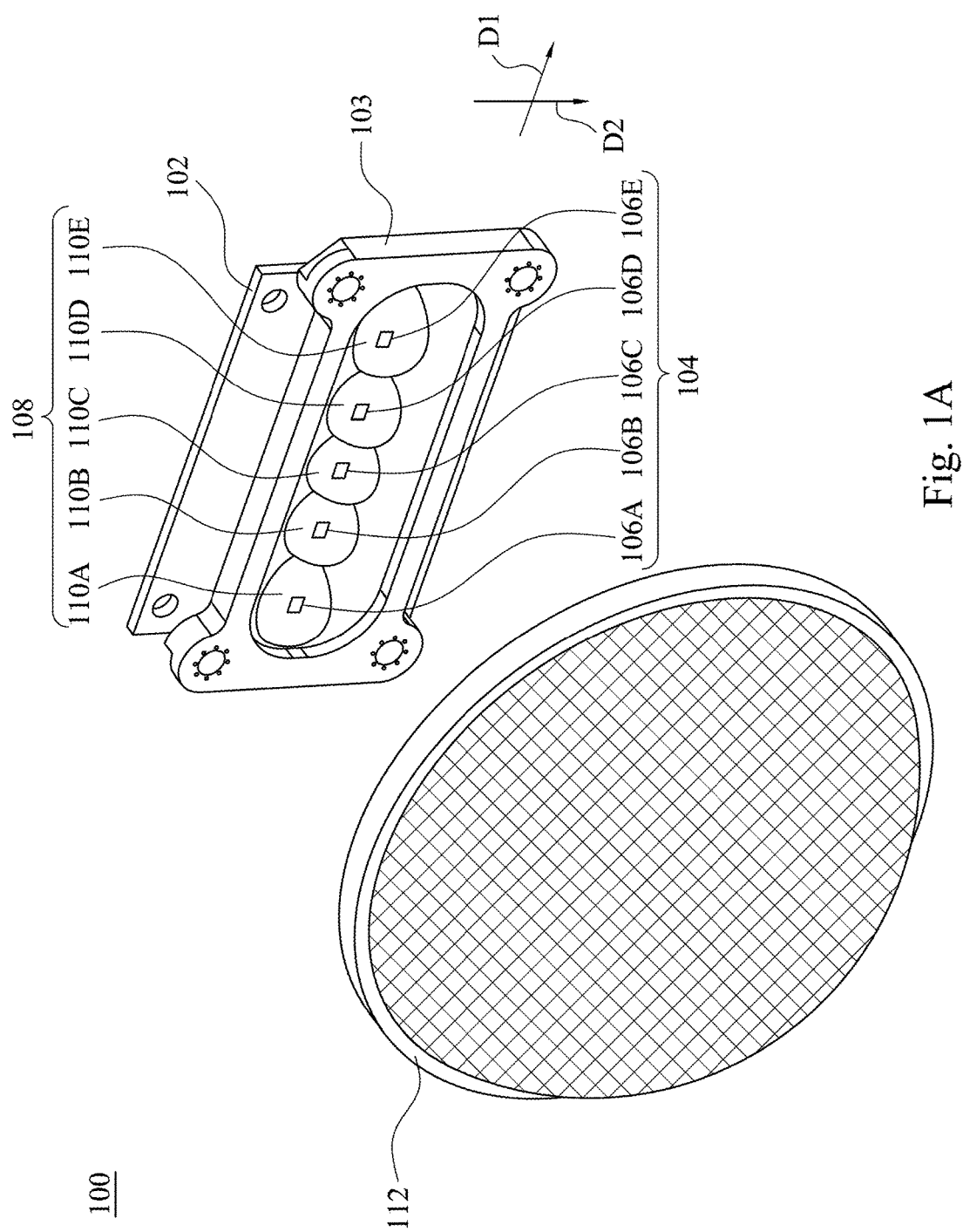
FIG. 1A is a perspective schematic view of a vehicle-lamp assembly in accordance with a first embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Figure 1B:
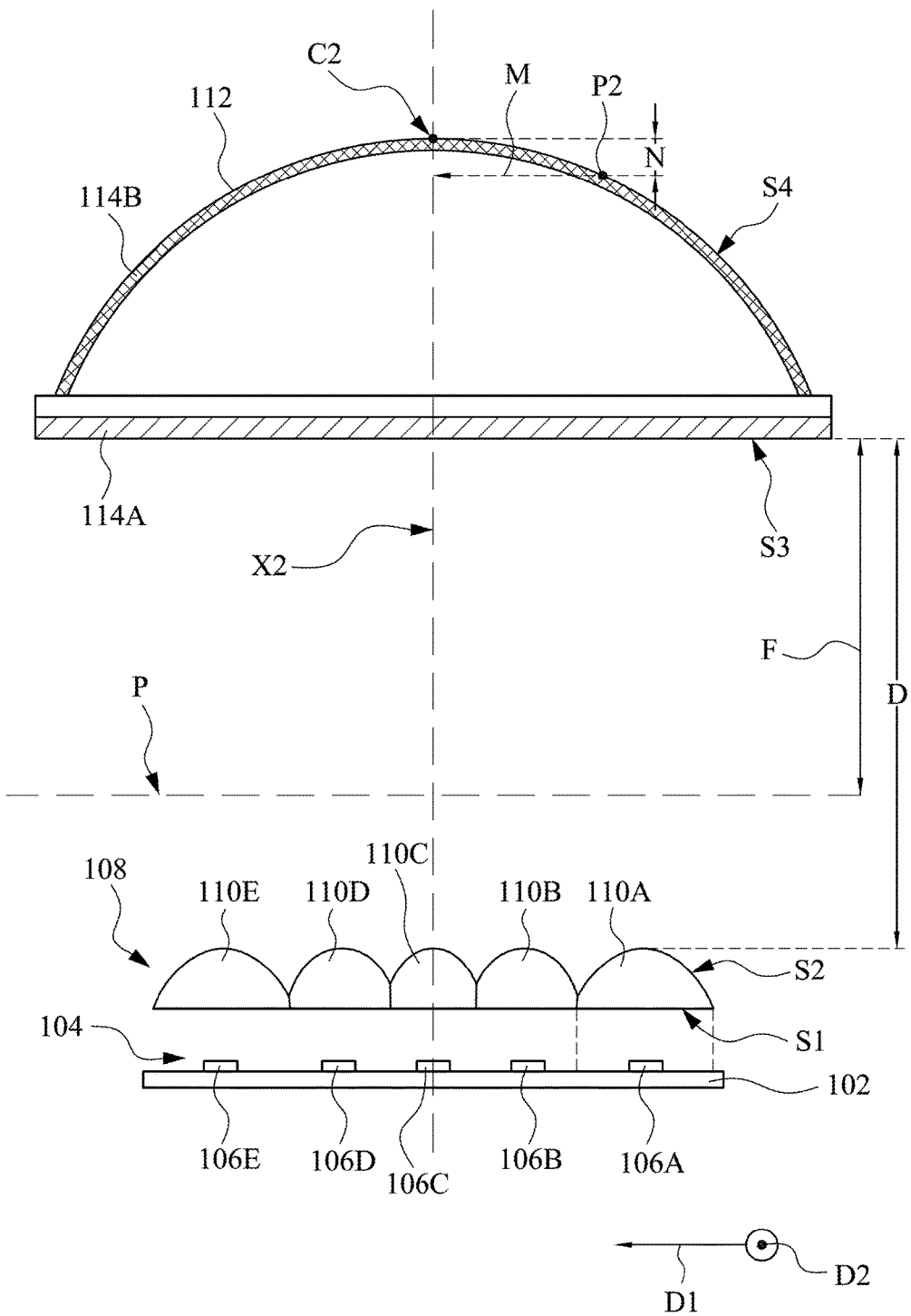
FIG. 1B is a cross section view of the vehicle-lamp assembly of FIG. 1A.

FIG. 1A is a perspective schematic view of a vehicle-lamp assembly 100 in accordance with a first embodiment of the present disclosure. FIG. 1B is a top view of the vehicle-lamp assembly 100 of FIG. 1A. For making the description succinct, a horizontal direction and a vertical direction with respect to the vehicle-lamp assembly 100 are respectively labeled as a first direction D1 and a second direction D2, in which the first direction D1 and the second direction D2 can be orthogonal to each other. In addition, in order not to make FIG. 1B too complicated, a fixed frame is not shown in FIG. 1B. The vehicle-lamp assembly 100 includes a light-source array 104, a lens array 108, and a projection lens 112. In this exemplary embodiment, the vehicle-lamp assembly 100 can be referred as a vehicle-lamp lens group.

The light-source array 104 is disposed on the substrate 102 and includes a plurality of light sources 106A-106E which are disposed on the substrate 102 and arranged along the first direction D1, in which the light sources 106A-106E can include at least one light-emitting diode chip. The lens array 108 is disposed on the substrate and includes a plurality of converging lenses 110A-110E arranged along the first direction D1. The light-source array 104 is located between the substrate 102 and the lens array 108, and the lens array 108 can converge at least one light beam provided by the light-source array 104 through the converging lenses 110A-110E. The light-source array 104 and the lens array 108 can be fixed to other base (not illustrated) through a fixed frame 103.

The light sources 106A-106E and the converging lenses 110A-110E can be arranged as one by one. For example, the light sources 106A-106E can be respectively covered with the converging lenses 110A-110E. Furthermore, the light sources 106A-106E and the converging lenses 110A-110E can be arranged in a linearly symmetric distribution. For example, the converging lenses 110A and 110B are arranged symmetrically about the converging lens 110C, the converging lenses 110D and 110E are arranged symmetrically about the converging lens 110C, and therefore the converging lenses 110A-110E are in a linearly symmetric distribution.

In the lens array 108, each of the converging lenses 110A-110E may has a light-incident surface and an illuminating surface which are opposite to each other. For example, as shown in FIG. 1B, the converging lens 110A has a light-incident surface S1 and an illuminating surface S2, in which the light-incident surface S1 faces the substrate 102. Adjacent two of the converging lenses 110A-110E can be connected with each other. For example, as shown in FIG. 1B, the converging lenses 110A and 110B can be connected with each other, and vertical projections of them on the substrate 102 abut against each other.

The projection lens 112 covers the lens array 108 and is configured to project the light beams propagated from the lens array 108. The projection lens 112 may be a fisheye lens. The projection lens 112 has a light-receiving surface S3 and a light-emitting surface S4 which are opposite to each other, in which the light-receiving surface S3 of the projection lens 112 faces the lens array 108. The projection lens 112 has a focal plane P. A distance from the light-receiving surface S3 to the focal plane P can be referred to as a focal length of the projection lens 112, in which the lens array 108 can be separated from the projection lens 112 by one to two times focal length. For example, a distance from the light-receiving surface S3 to the focal plane P is labeled as a focal length F, the shortest distance from the projection lens 112 to the lens array 108 is labeled as a shortest distance D, and F≤D≤2F. With the above configuration, when the light-source array 104 emits at least one light beam, the light beam can be converged through refraction by the lens array 108, and then the light beam enters the projection lens 112.

Figure 2A:
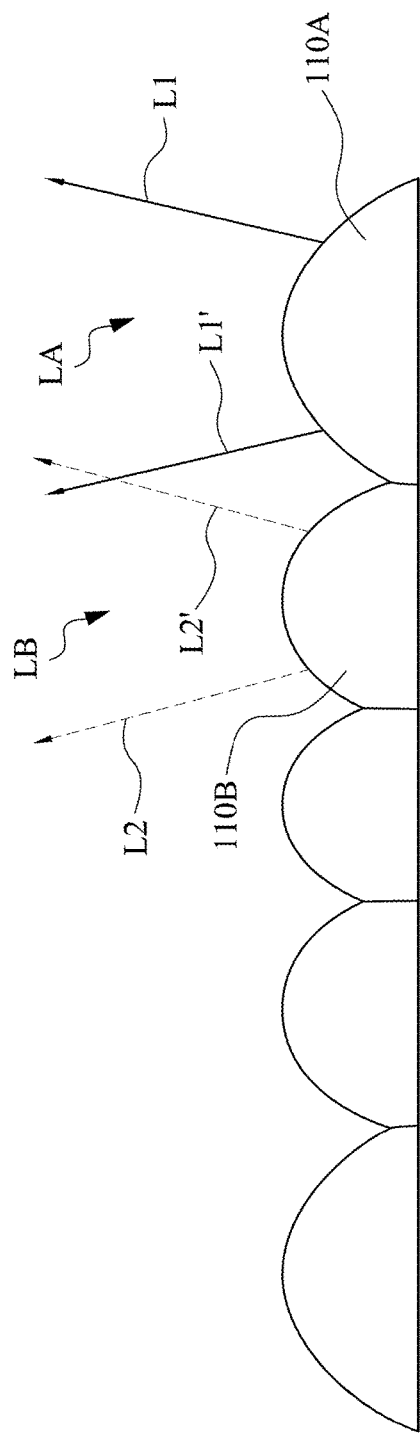
FIG. 2A is a schematic view illustrating that the adjacent converging lenses of the lens array project light beams.

With the refraction mechanism provided by the lens array 108, a light type of the light beams provided by the vehicle-lamp assembly 100 can be adjusted. For example, in the lens array 108, two of the light beams respectively converged by adjacent two of the converging lenses 110A-110E can at least partially overlap with each other by geometry of the adjacent two of the converging lenses 110A-110E, a distance between the adjacent two of the converging lenses 110A-110E, or a combination thereof. FIG. 2A is a schematic view illustrating that the adjacent converging lenses 110A and 110B of the lens array 108 project light beams. As shown in FIG. 2A, the converging lens 110A can converge and project the light beam entering therein, such as a light beam LA located in a region between lines L1 and L1'. The converging lens 110B can converge and project the light beam entering therein, such as a light beam LB located in a region between dash lines L2 and L2'. The light beams LA and LB can partially overlap with each other.

Figure 2B:
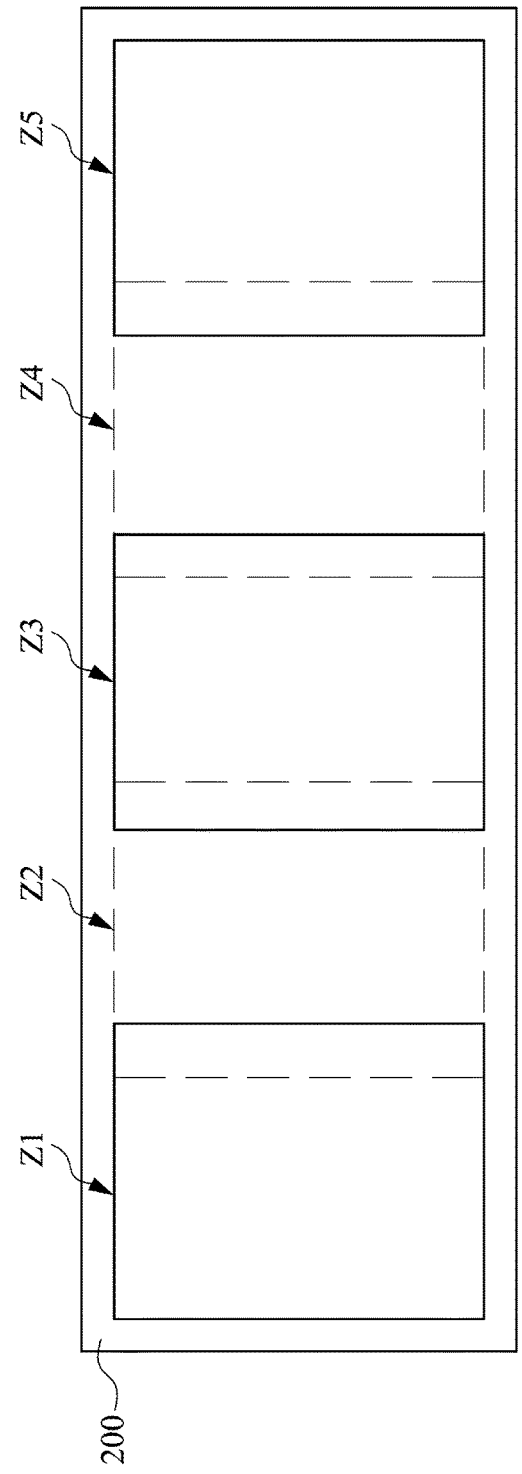
FIG. 2B is a schematic view illustrating an illumination formed on a screen by the light beams projected by the vehicle-lamp assembly.

When the projection lens 112 (see FIG. 1B) receives the light beams as FIG. 2A, the vehicle-lamp assembly 100 can provide a light type as FIG. 2. FIG. 2B is a schematic view illustrating an illumination formed on a screen 200 by the light beams projected by the vehicle-lamp assembly. As shown in FIG. 2B, the light beams provided by the converging lenses 110A-110E of the lens array 108 (see FIG. 1B) can be illuminated onto the screen 200, such that a plurality of projections Z1-Z5 are formed. The projections Z1, Z3, and Z5 are illustrated as lines, and the projections Z2 and Z4 are illustrated as dash lines. The projections Z1-Z5 can be formed by the light beams which are converged and projected by the lens array 108 and the projection lens 112 (see FIG. 1B). For example, the projection Z1 can be formed by the light beam which is converged by the converging lens 110 and projected by the projection lens 112 (see FIG. 1B) in sequence.

Adjacent two of the projections can partially overlap with each other, so as to improve the illumination uniformity of the light beams provided by the vehicle-lamp assembly 100. In addition, since the projections Z1-Z5 are formed by the light beams which are converged by the different converging lenses 110A-110E (see FIG. 1B) and are projected, respectively, properties of the projections Z1-Z5 may be controlled respectively. Accordingly, the adjustment of the light type of the light beams provided by the vehicle-lamp assembly 100 can tend to simplicity. For example, dimensions or an illumination strength distribution of the projections Z1-Z5 are adjustable.

Figure 3A:
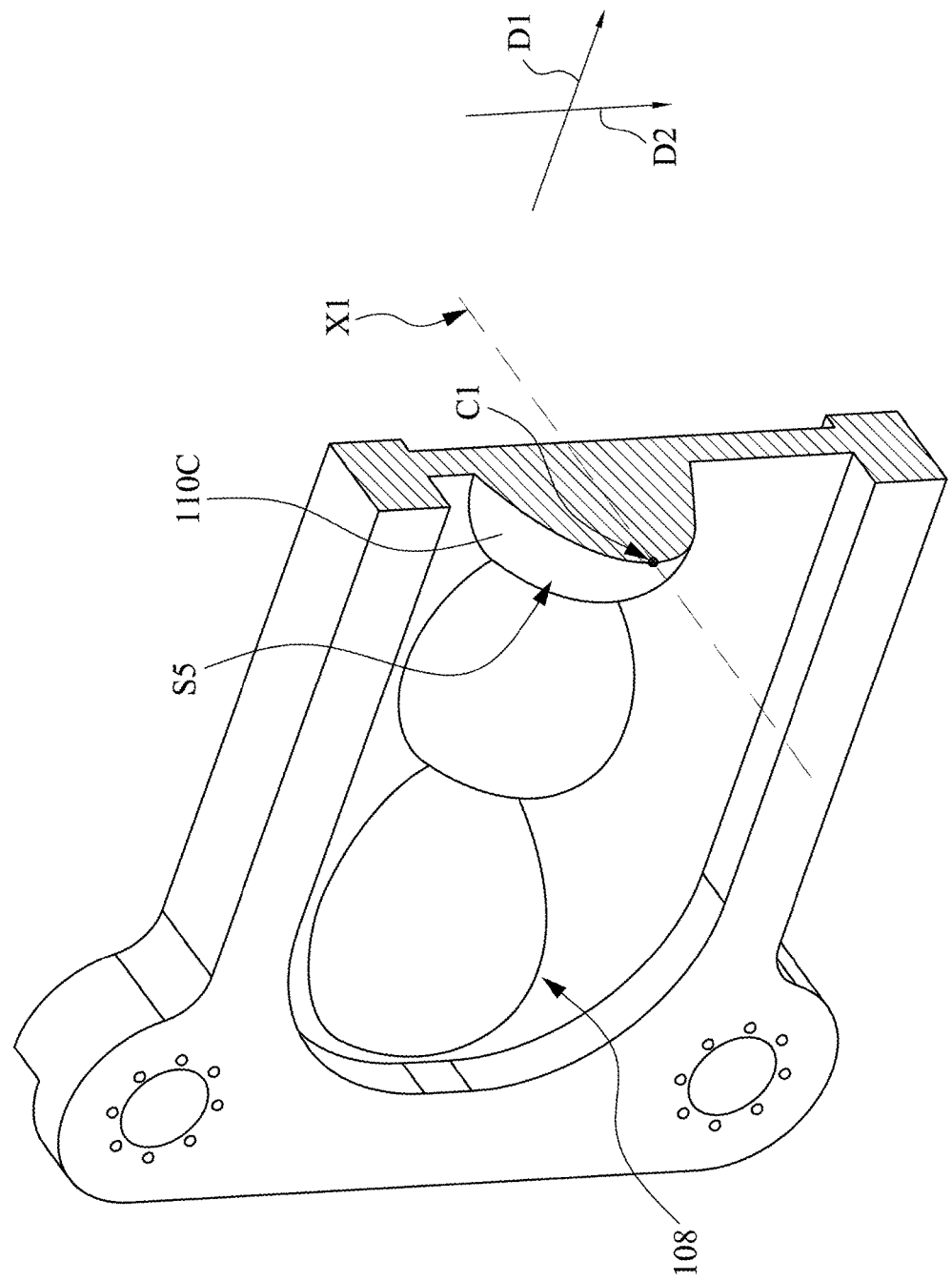
FIG. 3A is a perspective schematic view of the lens array viewed along the second direction.
Figure 3B:
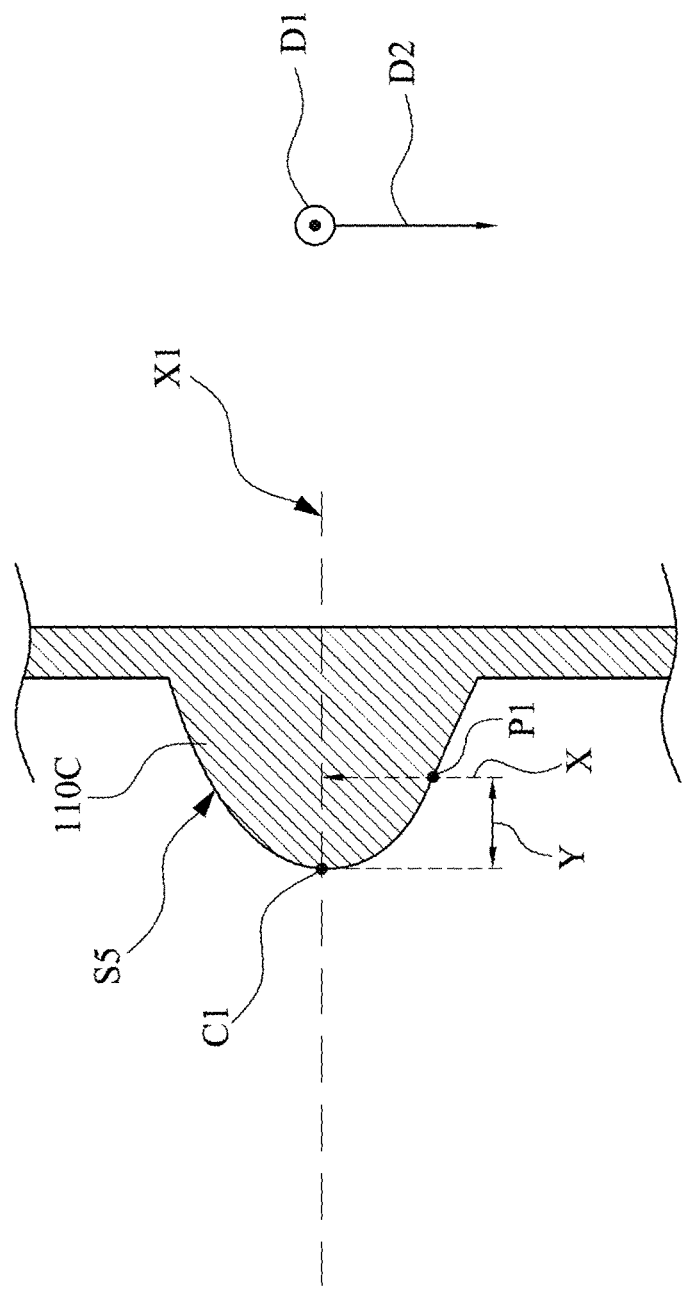
FIG. 3B is a cross section of the lens array of FIG. 3A taken along the second direction.

The following descriptions are provided with respect to the design of the lens array. FIG. 3A is a perspective schematic view of the lens array 108 viewed along the second direction D2. FIG. 3B is a cross section of the lens array 108 of FIG. 3A taken along the second direction D2. In the lens array 108, the illuminating surface of each of the converging lenses can be defined by at least one conic-curve equation.

As shown in FIGS. 3A and 3B, the converging lens 110C of the lens array 108 has an illuminating surface S5 having a first central point C1 and a first optical axis X1, and the first optical axis X1 passes through the first central point C1. A curvature of the illuminating surface S5 of the converging lens 110C measured along the second direction D2 can substantially satisfy:

$$y = \left(\frac{x^2}{R1}\right) \bigg/ 1 + \sqrt{\left(1 - (1 + K1)\left(\frac{x}{R1}\right)^2\right)}.$$

The parameter R1 is given by 1<R1<10, and the parameter K1 is given by −2<K1<0. The parameter y is a distance from any point on the illuminating surface S5 to the first central point C1 measured along a direction parallel to the first optical axis X1. The parameter x is a distance from the point on the illuminating surface S5 to the first optical axis X1 measured along a direction perpendicular to the first optical axis X1. For example, a distance from a point P1 on the illuminating surface S5 to the first central point C1 measured along the direction parallel to the first optical axis X1 can be label as a distance Y, and a distance from the point P1 on the illuminating surface S5 to the first optical axis X1 measured along the direction perpendicular to the first optical axis X1 can be label as a distance X. As the illuminating surface S5 of the converging lens 110C can substantially satisfy the above equation, the vehicle-lamp assembly 100 can correspondingly provide the suitable light type.

Figure 4A:
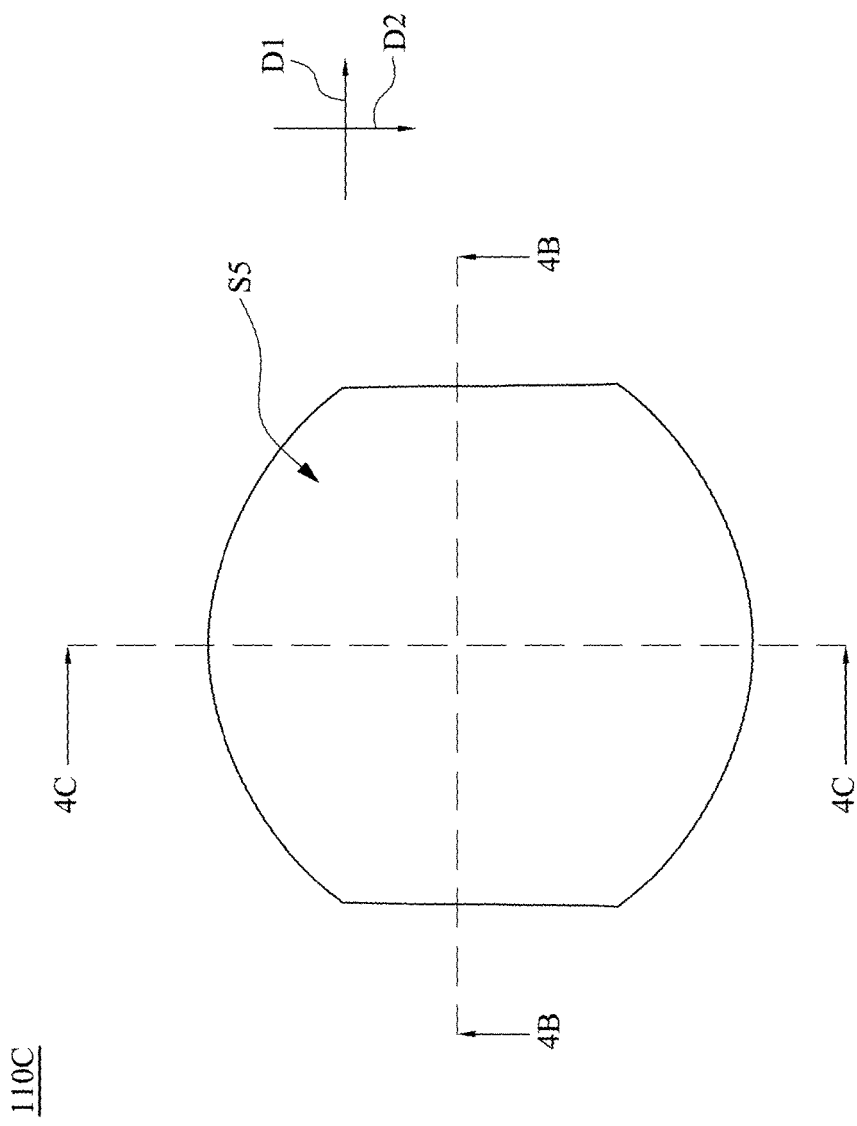
FIG. 4A is a front view of the converging lens.
Figure 4C:
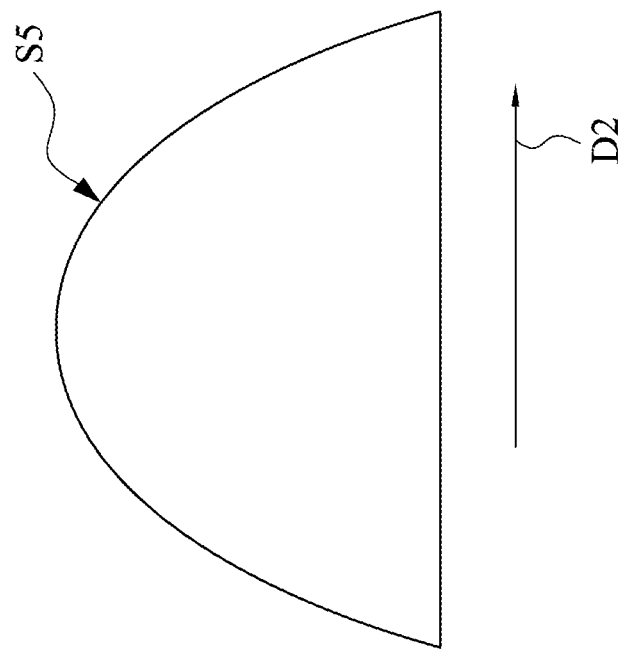
FIG. 4C is a cross section of the converging lens of FIG. 4A taken along the second direction.
Figure 4B:
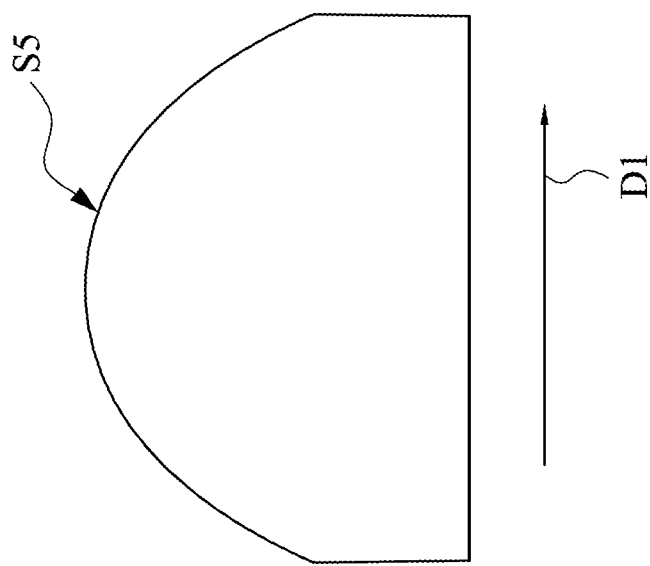
FIG. 4B is a cross section of the converging lens of FIG. 4A taken along the first direction.

FIG. 4A is a front view of the converging lens 110C. FIG. 4B is a cross section of the converging lens 110C of FIG. 4A taken along the first direction D1. FIG. 4C is a cross section of the converging lens 110C of FIG. 4A taken along the second direction D2. Curvatures measured along the first direction D1 and the second direction D2 of the illuminating surface S5 of the converging lens 110C can be respectively defined by the above equation, in which the curvatures measured along the first direction D1 and the second direction D2 can respectively take different combinations of parameters R1 and K1. Explained in a different way, the second direction D2 of the illuminating surface S5 may has different curvatures measured along the first direction D1 and the second direction D2.

As shown in FIGS. 4A and 4B, the illuminating surface S5 may have a first curvature measured along the first direction D1, and the first curvature can be defined by the above equation. As shown in FIGS. 4A and 4C, the illuminating surface S5 may have a second curvature measured along the second direction D2, and the second curvature can be defined by the above equation as well. The first curvature and the second curvature may respectively take different combinations of parameters R1 and K1, such that the first curvature is different than the second curvature. As the illuminating surface S5 of the converging lens 110C has different curvatures measured along the first direction D1 and the second direction D2, adjusting the dimensions of the projections Z1-Z5 (see FIG. 2B) can be achieved.

Reference is made back to FIG. 1B. In addition to the designs mentioned above, other configurations in the vehicle-lamp assembly 100 can correspondingly adjust the light type as well, so as to allow the light type to satisfy different requires. For example, dimensions of adjacent two of the converging lenses may be different from each other. That is, the converging lenses 110A and 110B which are adjacent to each other have different lengths along the first direction D1, so as to adjust the dimensions of the projections Z1-Z5 (see FIG. 2B.) Furthermore, as shown in FIG. 1A, adjacent two of the converging lenses may have different lengths along the second direction D2.

In addition, the projection lens 112 may have microstructures 114A and 114B which are respectively disposed on the light-receiving surface S3 and the light-emitting surface S4. The light type of the light beams projected by the projection lens 112 can be adjusted by the microstructures 114A which disposed on the light-receiving surface S3. The illumination uniformity of the light beams provided by the projection lens 112 can be adjusted by the microstructures 114B which disposed on the light-emitting surface S4. On the other hand, the light-emitting surface S4 of the projection lens 112 can be defined by at least one conic-curve equation as well, thereby adjusting the light type of the light provided therefrom. For example, the light-emitting surface S4 of the projection lens 112 has a second central point C2 and a second optical axis X2, and the second optical axis X2 passes through the second central point X2. A curvature of the light-emitting surface S4 of the projection lens 112 measured along a direction perpendicular to the first direction D1 can substantially satisfy:

$$n = \left(\frac{(m)^2}{R}\right) \bigg/ 1 + \sqrt{\left(1 - (1+K2)\left(\frac{M}{R2}\right)^2\right)}.$$

The parameter R2 is given by 10<R2<100. The parameter K2 is given by −2<K2<0. The parameter n is a distance from any point on the light-emitting surface S4 to the second central point C2 measured along a direction parallel to the second optical axis X2. The parameter m is a distance from the point on the light-emitting surface S4 to the second optical axis X2 measured along a direction perpendicular to the second optical axis X2. For example, a distance from a point P2 on the light-emitting surface S4 to the second central point C2 measured along the direction parallel to the second optical axis X2 can be labeled as a distance M, and a distance from the point P2 on the light-emitting surface S4 to the second optical axis X2 measured along a direction perpendicular to the second optical axis X2 can be labeled as a distance N.

Figure 5:
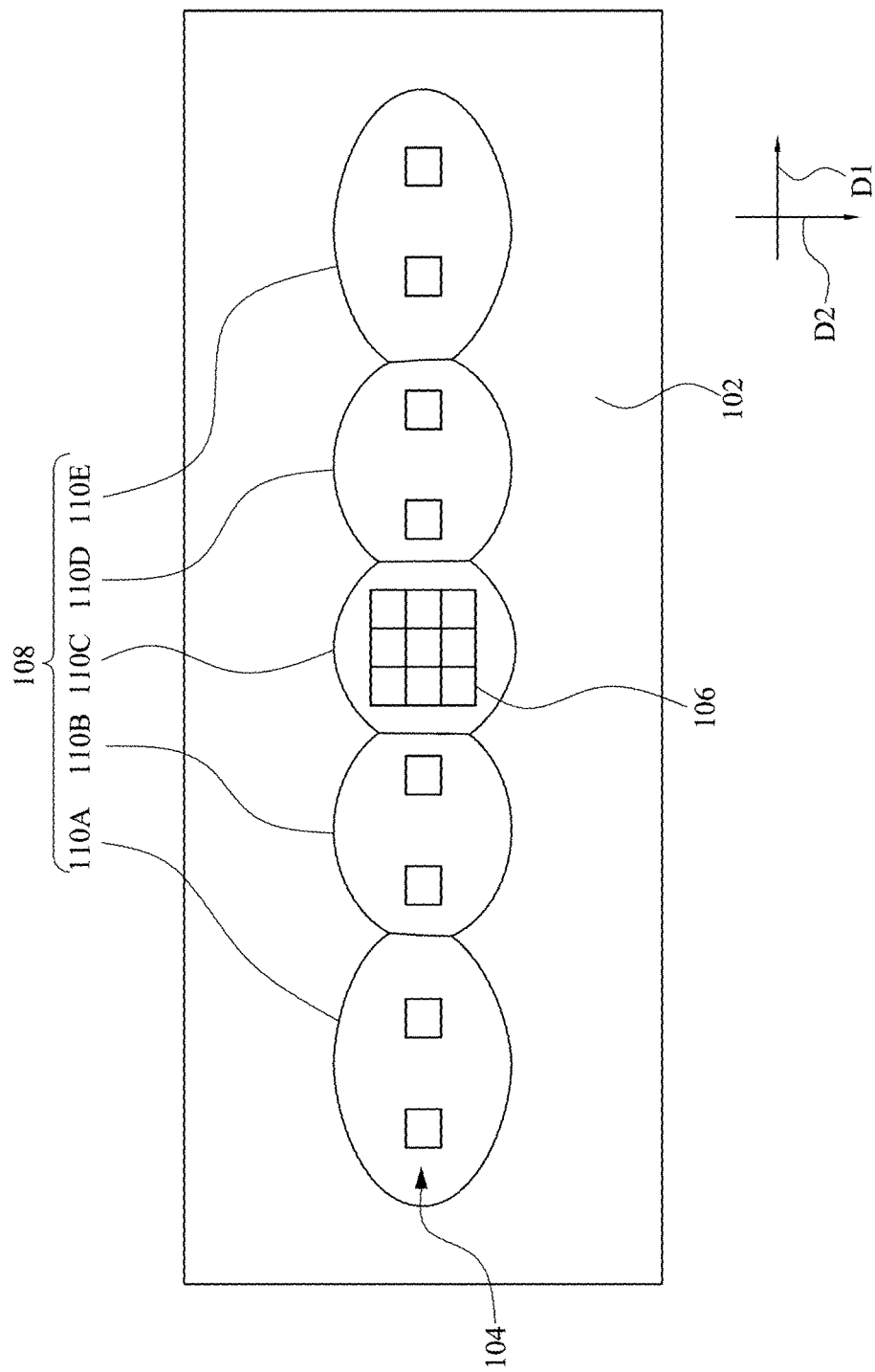
FIG. 5 is a front view of a substrate, a light-source array, and a lens array in accordance with a second embodiment of the present disclosure.

FIG. 5 is a front view of a substrate 102, a light-source array 104, and a lens array 108 in accordance with a second embodiment of the present disclosure. At least one difference between the present embodiments and the first embodiments is that the single converging lens corresponds with a plurality of the light source. For example, in the present embodiment, the converging lens 110C is located at the middle of the lens array 108, and the number of the light sources 106 which are covered with the vertical projection of the converging lens 110C on the substrate 102 is nine. Furthermore, regarding the converging lenses 110A, 110B, 110D, and 110E, the number of the light sources 106 which are covered with the vertical projection of one of the converging lenses 110A, 110B, 110D, and 110E on the substrate 102 is two. With such configuration, the brightness of the vehicle-lamp assembly can be enhanced.

Figure 6:
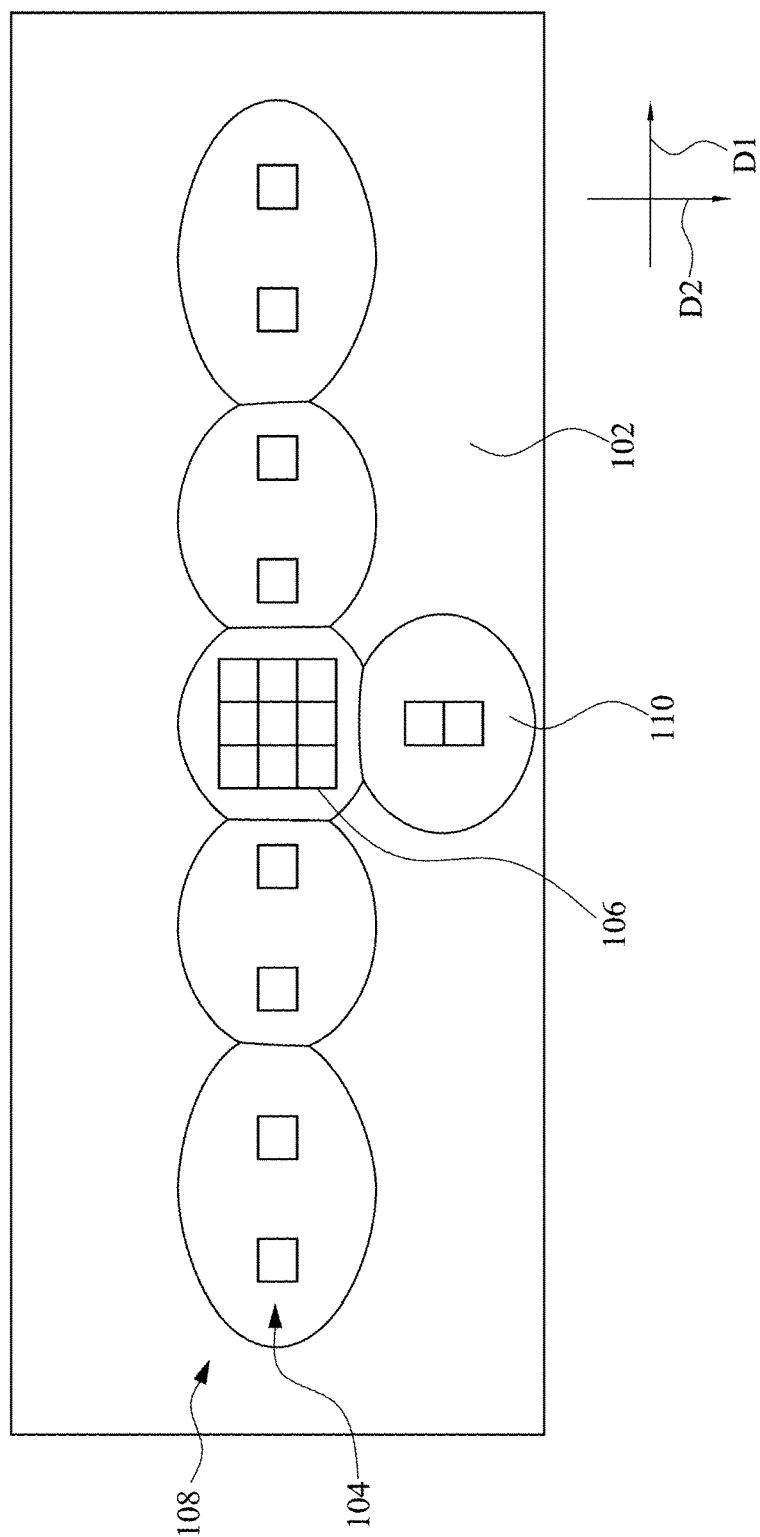
FIG. 6 is a front view of a substrate, a light-source array, and a lens array in accordance with a third embodiment of the present disclosure.

FIG. 6 is a front view of a substrate 102, a light-source array 104, and a lens array 108 in accordance with a third embodiment of the present disclosure. At least one difference between the present embodiments and the second embodiments is that the numbers of the light sources 106 and the converging lenses 110 are increased, and the light sources 106 and the converging lenses 110 are arranged along the first direction D1 and second direction D2. Accordingly, the light-source 104 and the lens array 108 are arranged in a T-shaped distribution. With such configuration, the illumination range the vehicle-lamp assembly can be enhanced.

Figure 7:
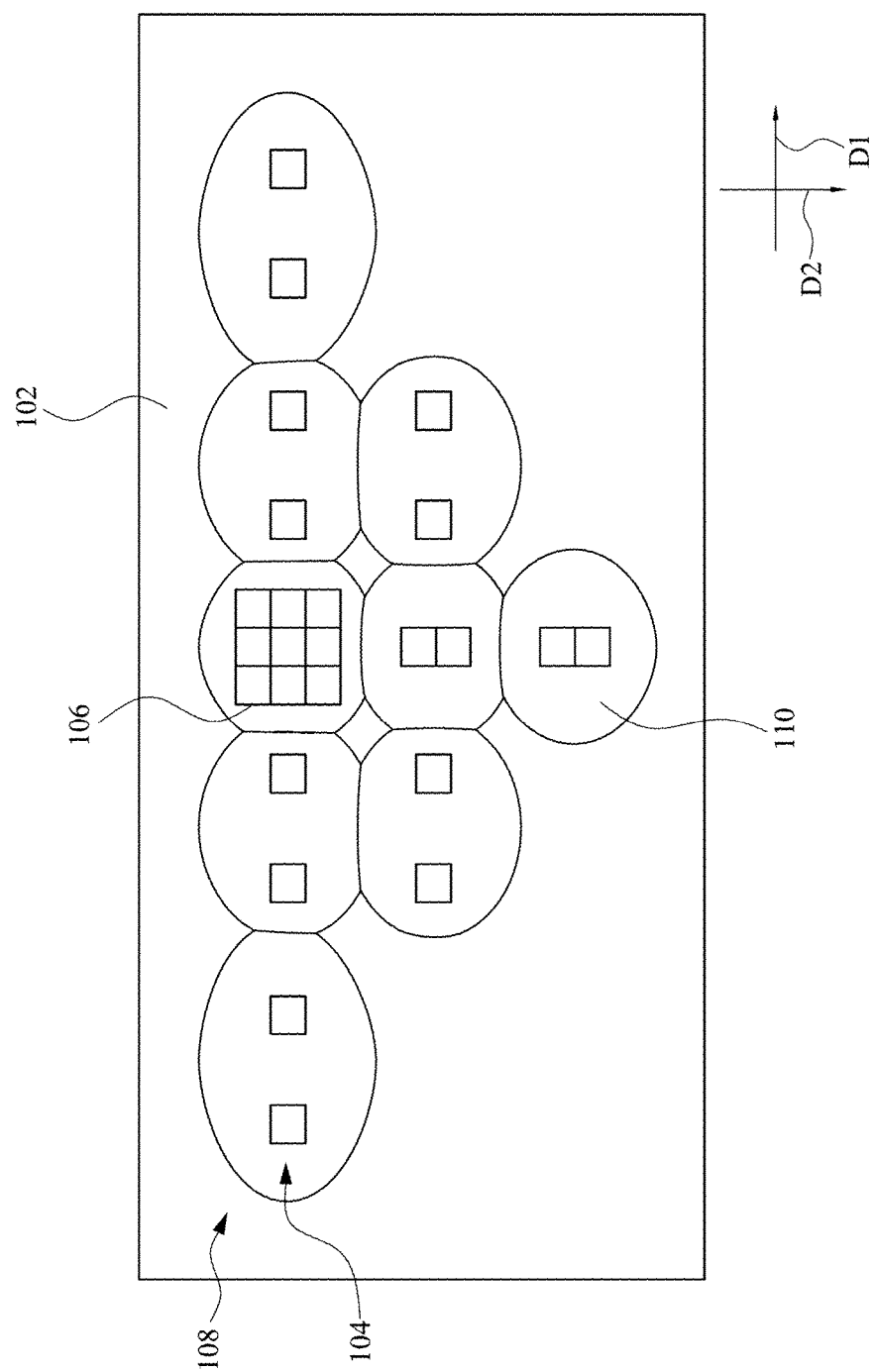
FIG. 7 is a front view of a substrate, a light-source array, and a lens array in accordance with a fourth embodiment of the present disclosure.

FIG. 7 is a front view of a substrate 102, a light-source array 104, and a lens array 108 in accordance with a fourth embodiment of the present disclosure. At least one difference between the present embodiments and the third embodiments is that the numbers of the light sources 106 and the converging lenses 110 are increased, such that the light-source 104 and the lens array 108 are in an arrangement with a plurality of rows. With such configuration, the illumination range the vehicle-lamp assembly can be enhanced. In addition, in this exemplary embodiment, the lens array 108 illustrated in FIG. 7 is in an arrangement with more than three rows or in a matrix arrangement.

Figure 8:
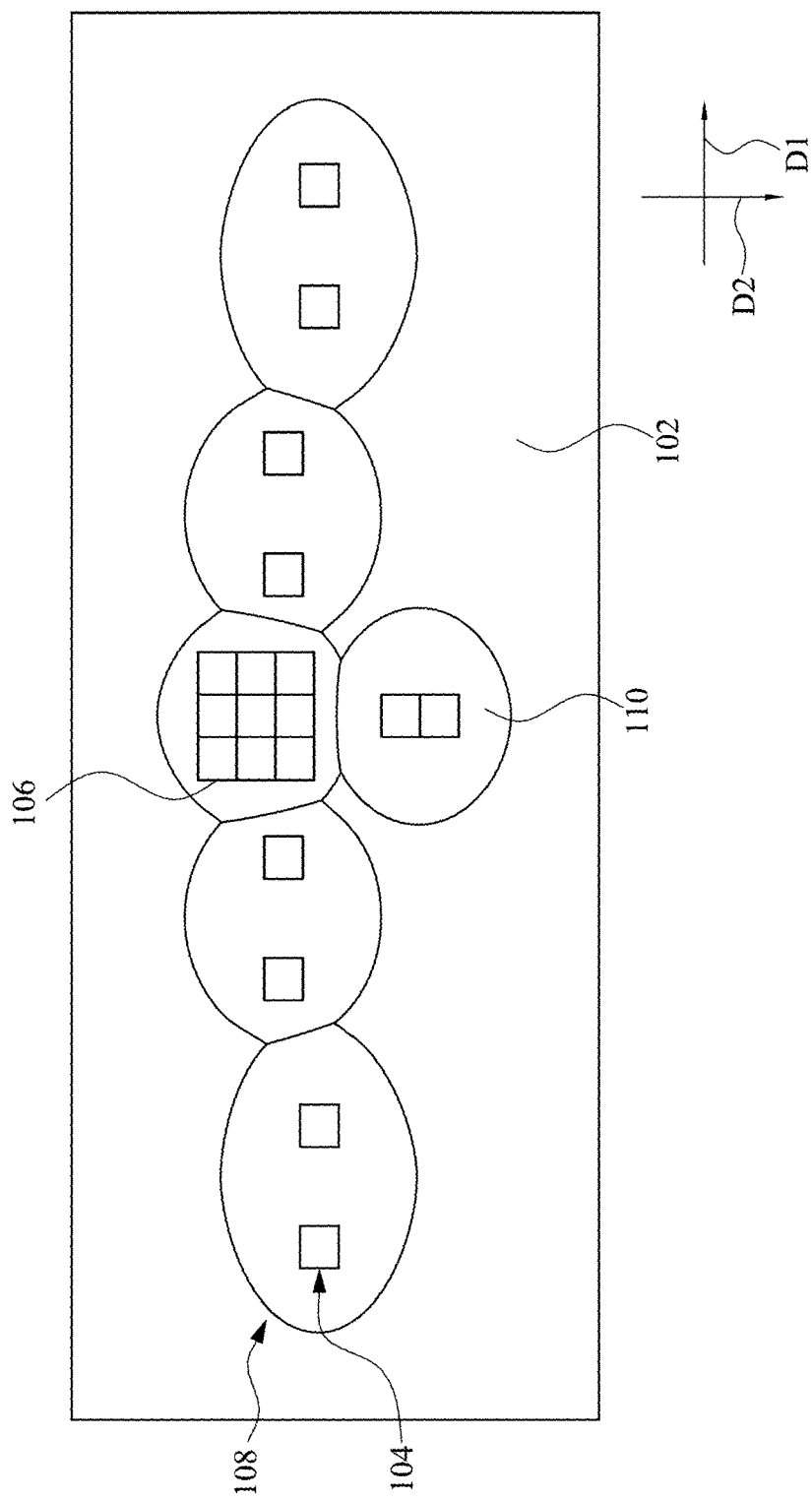
FIG. 8 is a front view of a substrate, a light-source array, and a lens array in accordance with a fifth embodiment of the present disclosure.

FIG. 8 is a front view of a substrate 102, a light-source array 104, and a lens array 108 in accordance with a fifth embodiment of the present disclosure. At least one difference between the present embodiments and the third embodiments is that vertical heights of the light sources 106 and the converging lenses 110 are gradual changed. For example, in the first row of the lens array 108, the converging lenses 110 located at the middle of the lens array 108 have the highest vertical heights, and the converging lenses 110 located at the opposite ends of the lens array 108 have the lowest vertical heights. In addition, in other embodiments, portions of the light source 106 and the converging lenses 110 are arranged in a U-shaped distribution.

Figure 9:
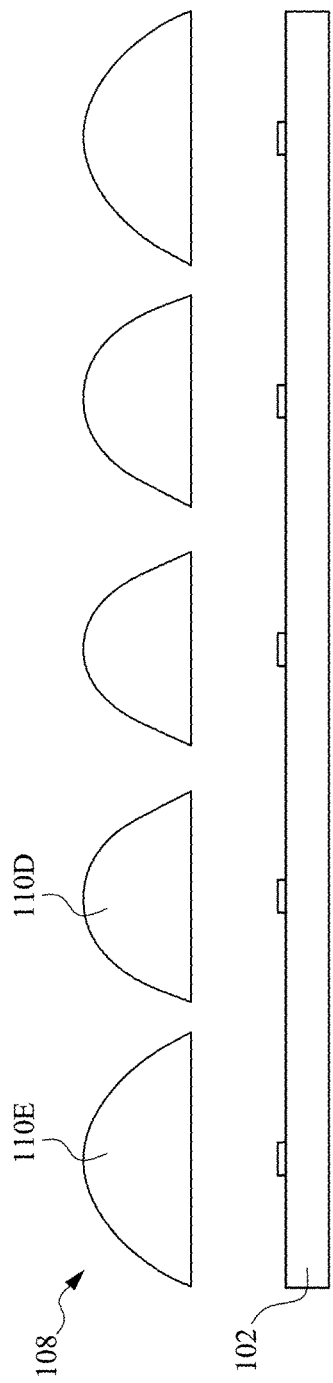
FIG. 9 is a front view of a substrate, a light-source array, and a lens array in accordance with a sixth embodiment of the present disclosure.

FIG. 9 is a front view of a substrate 102, a light-source array 104, and a lens array 108 in accordance with a sixth embodiment of the present disclosure. At least one difference between the present embodiments and the third embodiments is that adjacent two of the converging lenses of the lens array 108 are not connected with each other. For example, the converging lenses 110D and 110E are not connected with each other, and vertical projections of the converging lenses 110D and 110E on the substrate 102 are separated from each other. With such configuration, a distance between two of the projections Z1-Z5 (see FIG. 2B) can be adjusted.

Figure 10:
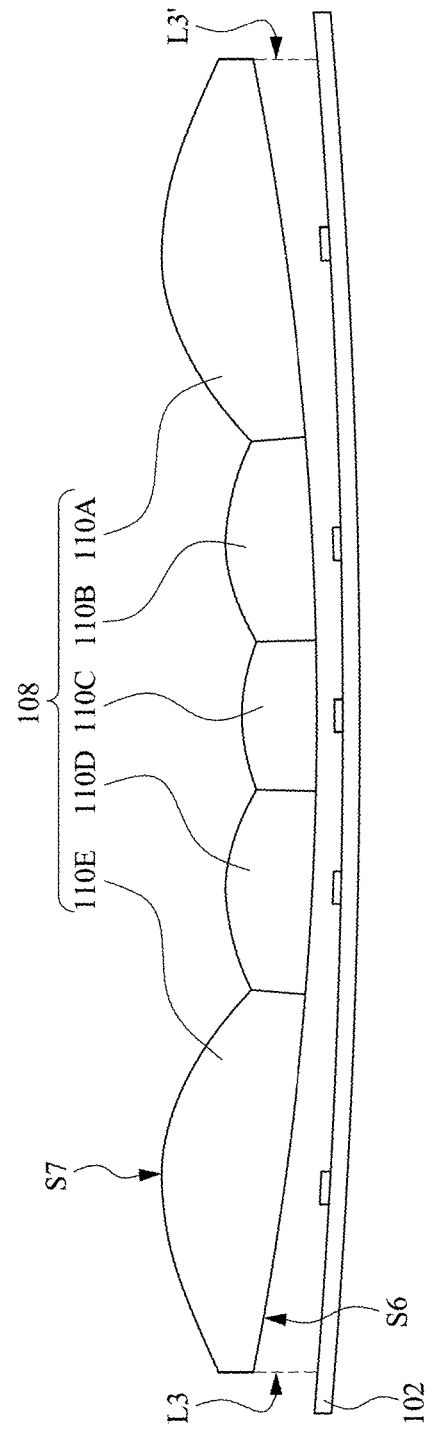
FIG. 10 is a perspective view of a substrate, a light-source array, and a lens array in accordance with a seventh embodiment of the present disclosure.

FIG. 10 is a front view of a substrate 102, a light-source array 104, and a lens array 108 in accordance with a seventh embodiment of the present disclosure. At least one difference between the present embodiments and the first embodiments is that the light sources 106A-106E are disposed on the curved substrate 102, and the illuminating surfaces of the converging lenses 110A-110E of the lens array 108 are curved.

In this exemplary embodiment, the converging lenses 110A-110E are connected with each other, such that the lens array 108 may include a light inlet surface S6 and a light outlet surface S7 which are defined together by the converging lenses 110A-110E. The light inlet surface S6 and the light outlet surface S7 are opposite to each other, in which the light inlet surface S6 is a curved surface facing the substrate 102. An area of the light inlet surface S6 of the lens array 108 is referred to as an area A1. An area of a vertical projection of the light inlet surface S6 of the lens array 108 on the substrate 102 is referred to as an area A2. An area of the light outlet surface S7 of the lens array 108 is referred to as an area A3. An area of a vertical projection of the light outlet surface S7 of the lens array 108 on the substrate 102 is referred to as an area A4. The area A3>the area A1>the area A2=the area A4, in which ranged of the area A2 and A4 can be defined as a range between a dash line L3 and another dash line L3'. With such configuration, a focal depth of the lens array 108 can be adjusted.

Figure 11:
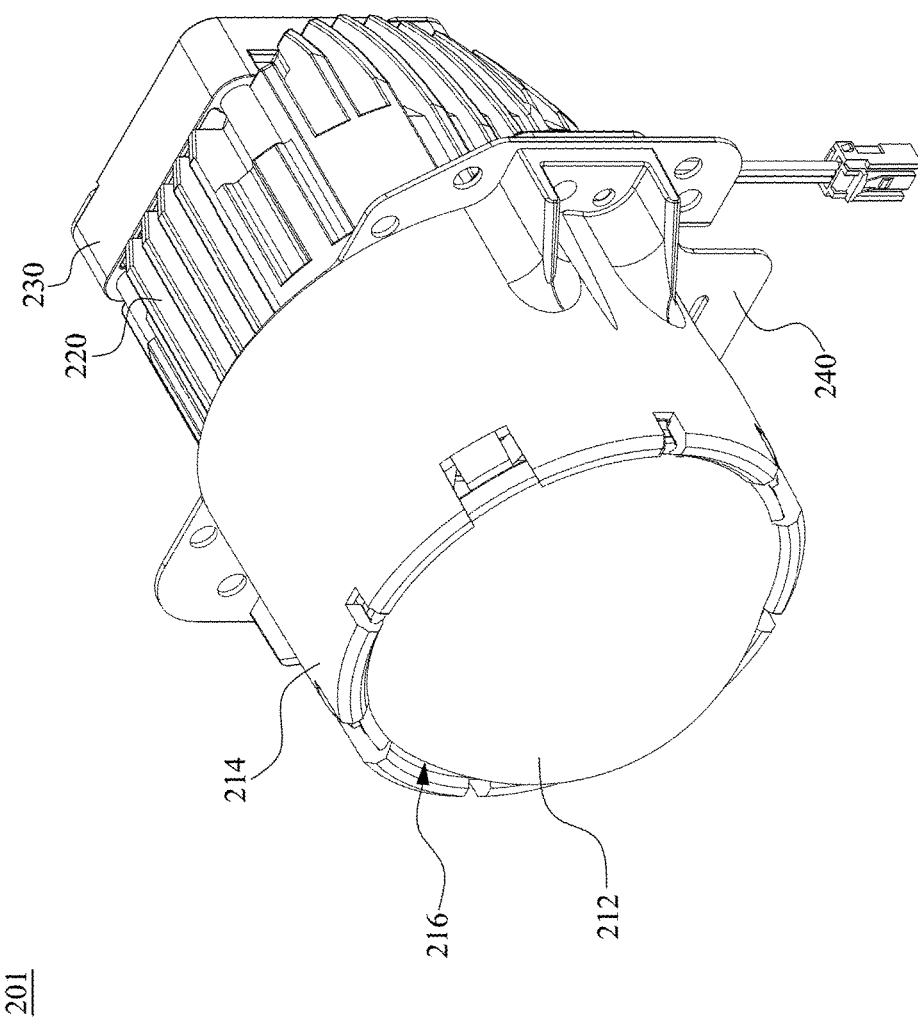
FIG. 11 is a perspective schematic view of a vehicle-lamp assembly in accordance with an eighth embodiment of the present disclosure.
Figure 12:
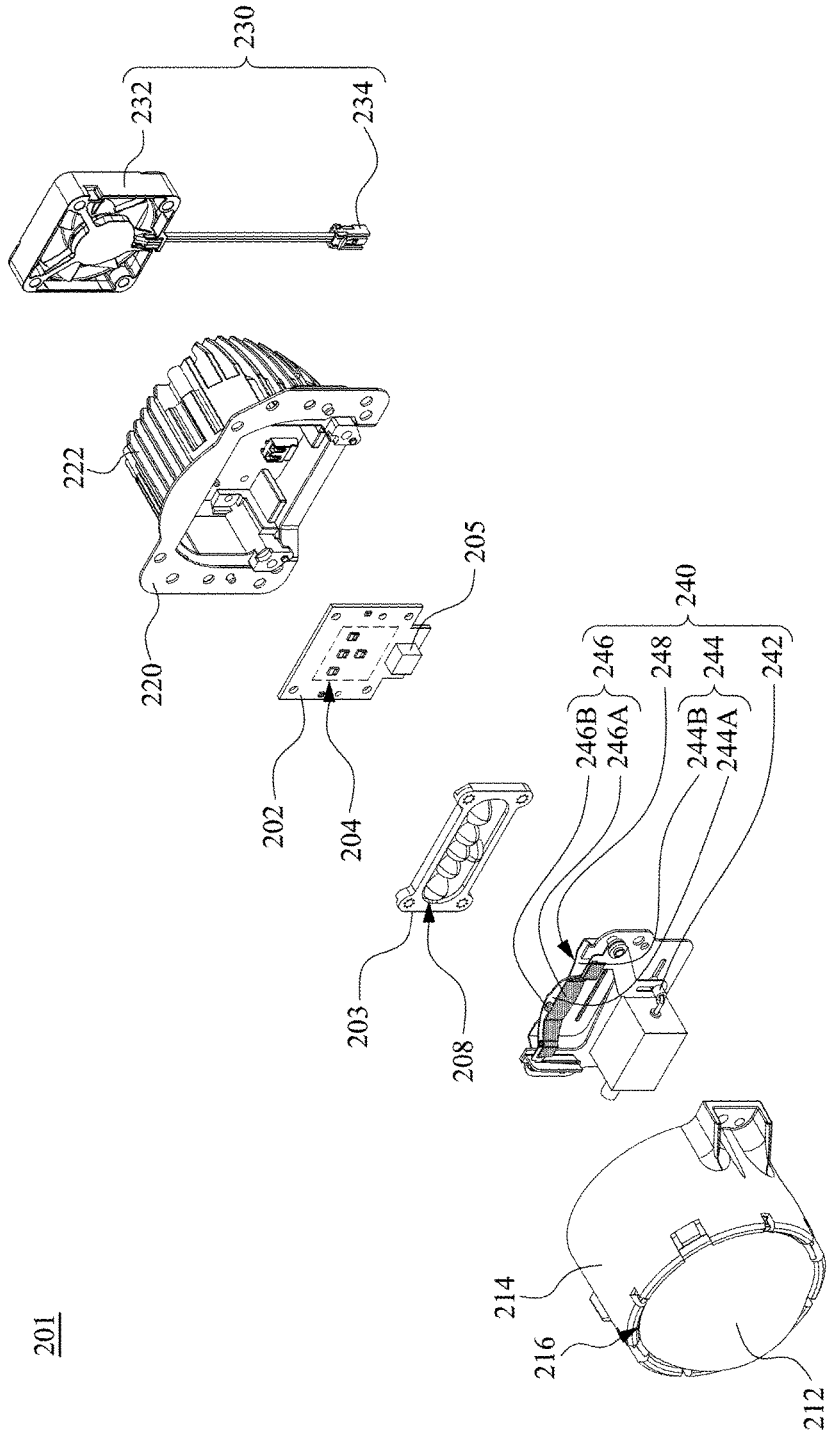
FIG. 12 is an exploded drawing of the vehicle-lamp assembly of FIG. 11.

FIG. 11 is a perspective schematic view of a vehicle-lamp assembly 201 in accordance with an eighth embodiment of the present disclosure. FIG. 12 is an exploded drawing of the vehicle-lamp assembly 201 of FIG. 11. In this exemplary embodiment, the vehicle-lamp assembly 201 includes a light-source array 204, a lens array 208, a projection lens 212, a fixed frame 214, a heat-dissipation base 220, a heat-dissipation module 230, and a switch device 240. The light-source array 204, the lens array 208, and the projection lens 212 of the vehicle-lamp assembly 201 can be the same as the above embodiments, and the descriptions with respect to them are not repeated herein.

The fixed frame 214 has an opening 216. The opening 216 has a dimension corresponding to the outer diameter of the projection lens 212, such that the projection lens 212 can be disposed within the fixed frame 214 through the opening 216. A substrate 202 and the light-source array 204 thereon can be disposed in the heat-dissipation base 220. The fixed frame 214 can be disposed on the heat-dissipation base 220. The light-source array 204 and the lens array 208 can be located between the heat-dissipation base 220 and the projection lens 212. As the light-source array 204 emits at least one light beam, the heat generated from the light-source array 204 can be transmitted from the heat-dissipation base 220 to the outside, thereby protecting the light-source array 204 from damage due to high temperature. Furthermore, the substrate 202 has an interface 205 which can couple to a first connection terminal of the heat-dissipation base 220, such that the light-source array 204 can be coupled with a power source (not illustrated) though the interface 205 of the substrate 202.

The heat-dissipation module 230 is connected with the heat-dissipation base 220 and includes a fan 232 and a second connection terminal 234. The fan 232 is electrically connected with the second connection terminal 234, so as to couple with a power source (not illustrated) through the second connection terminal 234. The heat-dissipation module 230 can provide the heat-dissipation base 220 with a heat-dissipation effect through the fan 232. For example, the heat-dissipation base 220 may have heat-dissipation fins 222, and the fan can generate an airflow traveling toward the heat-dissipation fin 222 of the heat-dissipation base 220. Accordingly, the heat-dissipation fin 222 of the heat-dissipation base 220 can perform thermal exchange with the airflow, so as to achieve the heat-dissipation effect.

The switch device 240 is disposed between the light-source array 204 and the projection lens 212. The switch device 240 is configured to switch a light type of a light beam entering the projection lens 212, so as to allow the light beam projected by the vehicle-lamp assembly 201 to switch to a low-beam mode or a high beam mode. The switch device 240 may include a transmission module 242, a light-blocking plate 244, a light-reflection zone 246, and a light-blocking zone 248. The light-blocking plate 244 includes a front light-blocking plate 244A and a back light-blocking plate 244B which are together connected with the transmission module 242. The light-reflection zone 246 is disposed on the front light-blocking plate 244A, and the light-blocking zone 248 is disposed on the back light-blocking plate 244B. Furthermore, the light-reflection zone 246 includes an adjustable reflection component 246A and a fixed reflection component 246B.

The transmission module 242 may include at least one transmission component which is movable in a rail of the switch device 240, so as to move the light-blocking plate 244. The projection lens 212, the switch device 240, and the light-source array 204 can be assembled along an arranging direction, and the front light-blocking plate 244A and the back light-blocking plate 244B of the light-blocking plate 244 is movable in a switch direction which intersects the arranging direction. In this exemplary embodiment, the arranging direction is orthogonal to the switch direction. That is, as the projection lens 212, the switch device 240, and the light-source array 204 are assembled along the horizontal direction, the transmission module 242 can move the front light-blocking plate 244A and the back light-blocking plate 244B of the light-blocking plate 244 in the vertical direction. Therefore, the switch device 240 can switch the light type of the light beam entering the projection lens 212 according to whether the light-blocking plate 244 blocks the light beam provided by the light-source array 204, thereby adjusting the light beam projected by the vehicle-lamp assembly 201 to the low-beam mode or the high beam mode.

In addition, the adjustable reflection component 246A and the fixed reflection component 246B of the light-reflection zone 246 and the light-blocking zone 248 can be moved with the by light-blocking plate 244 together by the transmission module 242, such that the adjustable reflection component 246A and the fixed reflection component 246B are movable in the switch direction as well. Accordingly, a light-blocking range caused by the light-blocking zone 248 is controllable. Furthermore, when the adjustable reflection component 246A moves, the fixed reflection component 246B may move with the adjustable reflection component 246A as well. The adjustable reflection component 246A and the fixed reflection component 246B of the light-reflection zone 246 can be configured to reflect the light beam propagated from the projection lens 212, so as to make the light beam projected by the vehicle-lamp assembly 201 avoid violating relative regulations of vehicle lighting.

For example, as the light beam provided by the light-source array 204 enters the projection lens 212 without traveling along an expected path, the light beam entering the projection lens 212 without traveling along the expected path may be reflected from the fixed frame 214 and then may travel toward the switch device 240. At this time, if the light beam is reflected from other element and then is projected again toward the outside by the projection lens 212, the vehicle-lamp assembly 201 would project a light beam which is not designed as expected, such that the light beam may not comply with the relative regulations of the vehicle lighting.

With designing the locations of the adjustable reflection component 246A and the fixed reflection component 246B and the light-reflection direction therefrom, the light beam reflected from the fixed frame 214 and traveling toward the fixed reflection component 246B can enter the projection lens 212 again by being reflected from the adjustable reflection component 246A and the fixed reflection component 246B. The light beam entering the projection lens 212 again can travel along the expected path according to the design of the adjustable reflection component 246A and the fixed reflection component 246B, so as to make the light beam projected by the vehicle-lamp assembly 201 avoid violating the relative regulations of the vehicle lighting. Moreover, in addition to making the light beam projected by the vehicle-lamp assembly 201 avoid violating the relative regulations of the vehicle lighting, the adjustable reflection component 246A and the fixed reflection component 246B of the light-reflection zone 246 can allow the light beam entering the projection lens 212 again to travel toward a target region designed as high brightness, thereby achieving brightness enhancement.

As described above, the vehicle-lamp assembly includes the light-source array, the lens array, and the projection lens. The light beams provided by the light-source array can be converged by the refraction mechanism provided by the lens array, and then the light beams can enter the projection lens. The lens array includes the converging lenses, and two of the light beams respectively converged by the adjacent two converging lenses at least partially overlap with each other by geometry of the adjacent two converging lenses, the distance between the adjacent two converging lenses, or a combination thereof, thereby improving the illumination uniformity of the light beams provided by the vehicle-lamp assembly. With the converging lenses, the vehicle-lamp assembly can provide a plurality of zones with illumination. The light type of the light beam projected to each of the zones can be controlled individually, such that the adjustment of the light type of the light beam projected by the vehicle-lamp assembly tends to simplicity.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A lens array disposed on a substrate and comprising:
a plurality of converging lenses configured to project light beams and arranged along a first direction, wherein two of the light beams respectively converged by adjacent two of the converging lenses at least partially overlap with each other by geometry of the adjacent two converging lenses, a distance between the adjacent two converging lenses, or a combination thereof, wherein each of the converging lenses has an illuminating surface facing away from the substrate and having a first central point and a first optical axis, the first optical axis passes through the first central point, and a curvature of the illuminating surface measured along a direction perpendicular to the first direction satisfies:

$$y = \left(\frac{x^2}{R1}\right) \Big/ 1 + \sqrt{\left(1 - (1 + K1)\left(\frac{x}{R1}\right)^2\right)},$$

wherein $1 < R1 < 10$ and $-2 < K1 < 0$, and y is a distance from any point on the illuminating surface to the first central point measured along a direction parallel to the first optical axis, x is a distance from the point on the illuminating surface to the first optical axis measured along a direction perpendicular to the first optical axis.

2. The lens array of claim 1, wherein the illuminating surface has a first curvature measured along the first direction and has a second curvature measured along a second direction which is orthogonal to the first direction, and the first curvature is different than the second curvature.

3. The lens array of claim 1, further comprising a light inlet surface and a light outlet surface which are defined together by the converging lenses, an area of the light inlet surface is A1, an area of a vertical projection of the light inlet surface on the substrate is A2, an area of the light outlet surface is A3, an area of a vertical projection of the light outlet surface on the substrate is A4, and A3>A1>A2=A4.

4. The lens array of claim 1, wherein the converging lenses are arranged along the first direction and a second direction which is orthogonal to the first direction, and a first group of the converging lenses and a second group of the converging lenses are arranged in a linearly symmetric distribution.

5. The lens array of claim 4, wherein the converging lenses are arranged in a T-shaped distribution or a U-shaped distribution.

6. The lens array of claim 4, wherein the converging lenses are arranged as three or more than three rows in a matrix arrangement.

7. The lens array of claim 1, wherein adjacent two of the converging lenses have different lengths along the first direction.

8. The lens array of claim 1, wherein adjacent two of the converging lenses have different lengths along a second direction which is orthogonal to the first direction.

9. The lens array of claim 1, vertical projections of adjacent two of the converging lenses on the substrate abut against each other.

10. The lens array of claim 1, vertical projections of adjacent two of the converging lenses on the substrate are separated from each other.

11. A vehicle-lamp lens group, comprising:
a lens array disposed on a substrate and comprising:
a plurality of converging lenses configured to project light beams and arranged along a first direction, wherein two of the light beams respectively converged by adjacent two of the converging lenses at least partially overlap with each other by geometry of the adjacent two converging lenses, a distance between the adjacent two converging lenses, or a combination thereof, wherein each of the converging lenses has an illuminating surface facing away from the substrate and having a first central point and a first optical axis, the first optical axis passes through the first central point, and a curvature of the illuminating surface measured along a direction perpendicular to the first direction satisfies:

$$y = \left(\frac{x^2}{R1}\right) \Big/ 1 + \sqrt{\left(1 - (1+K1)\left(\frac{x}{R1}\right)^2\right)},$$

wherein 1<R1<10 and −2<K1<0, and y is a distance from any point on the illuminating surface to the first central point measured along a direction parallel to the first optical axis, x is a distance from the point on the illuminating surface to the first optical axis measured along a direction perpendicular to the first optical axis;
a light-source array disposed on the substrate and between the substrate and the lens array, wherein the light-source array comprises a plurality of light sources disposed on the substrate and arranged at least along the first direction, and the lens array is configure to project at least one light beam provided by the light-source array; and
a projection lens covering the lens array.

12. The vehicle-lamp lens group of claim 11, wherein the number of the converging lenses arranged in a first row of the lens array is (2N+1), and N is a positive integer, wherein the number of the light sources which are within a vertical projection of the (N+1) converging lenses arranged in the first row of the lens array is plural.

13. The vehicle-lamp lens group of claim 11, wherein a focal length of the projection lens is F, a shortest distance from the projection lens to the lens array is D, and F≤D≤2F.

14. The vehicle-lamp lens group of claim 11, wherein the projection lens has a light-emitting surface and at least one microstructure, the light-emitting surface faces away from the lens array, and the microstructure is disposed on the light-emitting surface of the projection lens.

15. The vehicle-lamp lens group of claim 11, wherein the projection lens has a light-receiving surface and at least one microstructure, the light-receiving surface faces the lens array, and the microstructure is disposed on the light-receiving surface of the projection lens.

16. The vehicle-lamp lens group of claim 11, wherein the projection lens has a light-emitting surface facing away from the lens array and having a second central point and a second optical axis, the second optical axis passes through the second central point, and a curvature of the light-emitting surface of the projection lens measured along a direction perpendicular to the first direction satisfies:

$$n = \left(\frac{(m)^2}{R}\right) \Big/ 1 + \sqrt{\left(1 - (1+K2)\left(\frac{M}{R2}\right)^2\right)},$$

wherein 10<R2<100 and −2<K2<0, and n is a distance from any point on the light-emitting surface to the second central point measured along a direction parallel to the second optical axis, m is a distance from the point on the light-emitting surface to the second optical axis measured along a direction perpendicular to the second optical axis.

17. A vehicle-lamp assembly, comprising:
a vehicle-lamp lens group, comprising:
a lens array disposed on a substrate and comprising:
a plurality of converging lenses configured to project light beams and arranged along a first direction, wherein two of the light beams respectively converged by adjacent two of the converging lenses at least partially overlap with each other by geometry of the adjacent two converging lenses, a distance between the adjacent two converging lenses, or a combination thereof, wherein each of the converging lenses has an illuminating surface facing away from the substrate and having a first central point and a first optical axis, the first optical axis passes through the first central point, and a curvature of the illuminating surface measured along a direction perpendicular to the first direction satisfies:

$$y = \left(\frac{x^2}{R1}\right) \Big/ 1 + \sqrt{\left(1 - (1+K1)\left(\frac{x}{R1}\right)^2\right)},$$

wherein 1<R1<10 and −2<K1<0, and y is a distance from any point on the illuminating surface to the first central point measured along a direction parallel to the first optical axis, x is a distance from the point on the illuminating surface to the first optical axis measured along a direction perpendicular to the first optical axis;
a light-source array disposed on the substrate and between the substrate and the lens array, wherein the light-source array comprises a plurality of light sources disposed on the substrate and arranged at least along the first direction, and the lens array is configure to project at least one light beam provided by the light-source array; and
a projection lens covering the lens array;
a fixed frame having an opening therein, wherein the projection lens is disposed within the fixed frame through the opening;
a heat-dissipation base having at least one heat-dissipation fin, wherein the fixed frame is disposed on the heat-dissipation base, the light-source array is disposed in the heat-dissipation base, and the light-source array and the lens array are located between the heat-dissipation base and the projection lens;
a heat-dissipation device connected with the heat-dissipation base and configured to generate an airflow traveling toward the heat-dissipation fin; and
a switch device disposed between the light-source array and the projection lens and having at least one light-blocking plate, wherein the projection lens, the switch device, and the light-source array are assembled along an arranging direction, and the light-blocking plate is movable in a switch direction which intersects the arranging direction.

18. The vehicle-lamp assembly of claim 17, wherein the light-blocking plate at least comprises a front light-blocking plate and a back light-blocking plate.

19. The vehicle-lamp assembly of claim 18, wherein the switch device has a light-reflection zone disposed on the front light-blocking plate and facing the projection lens.

20. The vehicle-lamp assembly of claim 18, wherein the switch device has a light-blocking zone disposed on the back light-blocking plate and facing the light-source array.

\* \* \* \* \*